US006039822A

United States Patent [19]

Heyworth et al.

[11] Patent Number: 6,039,822

[45] Date of Patent: Mar. 21, 2000

[54] DECAL APPLYING PROCESS USNG DIRECT SCREEN PRINTING

[76] Inventors: Diane S. Heyworth; Robert C. Heyworth, both of W8324 Tower Dr., Adell, Wis. 53001

[21] Appl. No.: 09/223,573

[22] Filed: Dec. 30, 1998

[51] Int. Cl.[7] ..................... B32B 31/12

[52] U.S. Cl. ..................... 156/82; 156/277

[58] Field of Search ..................... 156/82, 277, 384, 156/387, 497, 230

[56] References Cited

U.S. PATENT DOCUMENTS

| | | | |
|---|---|---|---|
| 3,344,012 | 9/1967 | af Strom | 428/126 |
| 3,960,633 | 6/1976 | Gossie | 156/247 |
| 3,970,508 | 7/1976 | Gossie | 156/477 |
| 4,026,755 | 5/1977 | Gossie | 156/538 |
| 4,522,864 | 6/1985 | Humason et al. | 428/201 |
| 4,802,943 | 2/1989 | Gibbons et al. | 156/244.23 |
| 5,032,449 | 7/1991 | af Strom | 428/195 |
| 5,098,772 | 3/1992 | af Strom | 428/211 |
| 5,116,649 | 5/1992 | Massouda | 428/34.2 |
| 5,229,201 | 7/1993 | Blanco | 428/284 |
| 5,328,535 | 7/1994 | Blanco | 156/155 |
| 5,514,315 | 5/1996 | Watkins et al. | 264/80 |
| 5,552,002 | 9/1996 | Farrell et al. | 156/82 |

*Primary Examiner*—James Sells

*Attorney, Agent, or Firm*—Andrus, Sceales, Starke & Sawall

[57] ABSTRACT

A process of applying decals to products having rough textured surfaces, such as products made from thermoplastic resins, leather, or synthetic leather. The decals applied to the products contain detailed multicolor graphic images made from a four color printing process. The decal applying process includes applying a first clear ink layer directly to the substrate surface, applying a water-release slide-off decal on top of the first clear ink layer, and applying a second clear ink layer over the applied decal to firmly bond the decal to the substrate surface. The two ink layers encapsulate the decal on the substrate surface, maintaining the integrity of the decal.

21 Claims, 2 Drawing Sheets

DECAL APPLYING PROCESS USNG DIRECT SCREEN PRINTING

BACKGROUND OF THE INVENTION

The present invention relates to methods of applying decals to surfaces, and more particularly, to a method of applying decals to various surfaces having a somewhat rough texture, such as the surfaces of products made from thermoplastic resins, leather, or synthetic leather. The process of the present invention is specific to printing on thermoplastic surfaces, but is also applicable to printing on leather or synthetic leather surfaces.

Corporate logos and the like are often applied to products made from thermoplastic resins, leather, or synthetic leather. Examples of these products might include coolers, ice chests, or sports equipment such as footballs, basketballs, etc. The present invention is directed to applying detailed multicolor graphic decals to the surfaces of these products.

The most common prior art process for applying detailed multicolor graphic images to rough textured substrate surfaces is direct screen printing or normal decal application. However, there are problems associated with these prior art processes. For example, it is very difficult to print detailed multicolor graphic images on hard rough textured surfaces without loosing some clarity, color, detail and registration of the graphical image. These rough textured surfaces tend to cause the printing to bleed and lose registration.

In addition, it is very difficult to apply decals directly on these surfaces. The decals often do not adhere firmly to the surfaces. The decals either peel off or are easily broken apart during normal wear and tear. Also, the decals are prone to being scratched d chipped.

The present invention arose during efforts by the inventors to develop a practical process for applying decals to hard rough textured substrate surfaces such as on coolers and the like that overcome the problems of the prior art. The inventors developed a new unique process for applying detailed multicolor decals to hard rough substrate surfaces using direct screen printing. The present invention's advantages over the prior art include the ability to apply a more detailed, sharper image decal that has more durability and is less costly to apply than in other prior art decal applying processes.

SUMMARY OF THE INVENTION

The present invention is a decal applying process using direct screen printing for applying decals of detailed, multicolor graphic images or substrates having rough textured surfaces such as on products made from thermoplastic resins, leather or synthetic leather.

In accordance with the present invention, a method for applying a decal to rough textured surface includes applying a first ink layer to the substrate surface, applying a decal to the first ink layer, and applying a second ink layer over the decal and first ink layer so that the decal is encapsulated between the first ink layer and the second ink layer.

The process of the present invention includes first flame treating the exterior surface of the substrate in an area where a decal is to be applied. The flame treated substrate is then screen printed with a clear ink specifically formulated for printing on the substrate surface. The ink is screen printed directly on the substrate surface. After screen printing the first ink layer, the ink is allowed to dry for up to 48 hours before being decaled. The next step in the process is applying a water-release slide-off decal to the first ink layer. The decal is submersed in a container of water to loosen the decal from its backing sheet, and is applied directly to the first ink layer. The first ink layer preferably covers a larger area on the substrate surface than the decal. The decaled surface is then heated to reactivate the solvent in the first ink layer to bond the decal to the surface. Next, the decaled surface is squeegeed with a soft roller to remove any excess air, ink or water from under the decal. The decaled surface is then allowed to dry for approximately 12 to 24 hours. Finally, a second clear ink layer is applied directly over the decaled surface. The second ink layer is screen printed directly over the decal and first ink layer. The substrate is then allowed to dry for a minimum of six hours to completely cure the decal and screen printing. The second ink layer preferably covers an area substantially equal to the area covered by the first ink layer.

Various other features, objects and advantages of the invention will be made apparent from the following description taken together with the drawings.

DETAILED DESCRIPTION OF THE INVENTION

Figure 1:
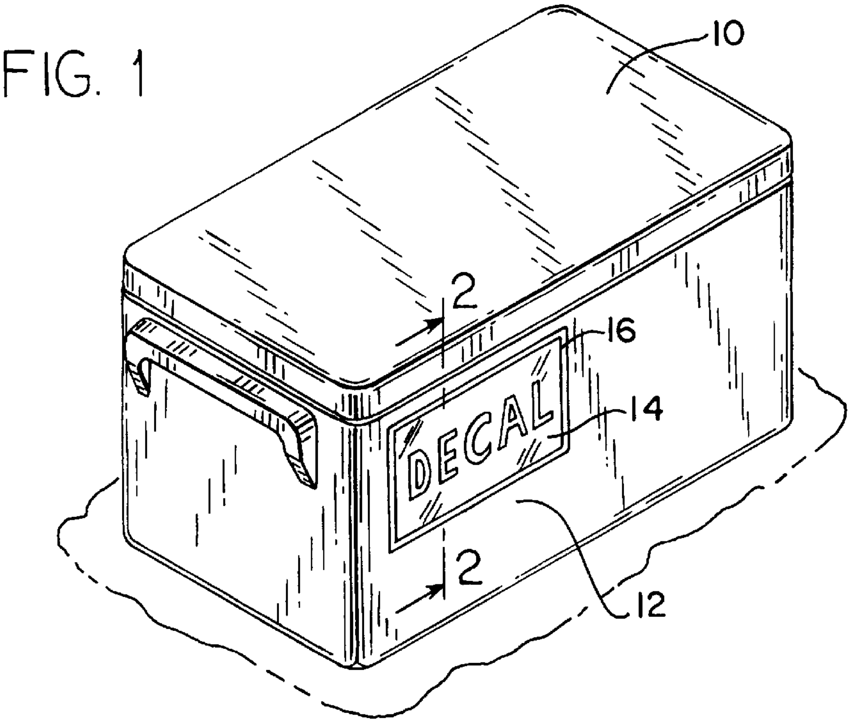
FIG. 1 is a perspective view of a cooler having a decal applied to its outer surface in accordance with the present invention.

FIG. 1 illustrates a decal 14 applied to the surface 12 of a cooler or ice chest 10 in accordance with the present invention. The decal 14 is applied using a new unique screen printing process in which a clear ink is first applied to the substrate surface 12, a water-release slide-off decal 14 is applied on top of the screen printed clear ink layer, and a second clear ink layer is screen printed on top of the first clear ink layer and the decal. The screen printed first and second clear ink layers are indicated by reference numeral 16 in FIG. 1. This process is preferably suited for applying decals to rough textured thermoplastic surfaces such as polyethylene, but may also be applicable to products made of leathers or synthetic leathers such as footballs, basketballs, etc. The process can be used to apply water-release slide-off decals on products having a rough textured exterior surface or a smooth textured exterior surface, but is specifically designed for products having a somewhat rough textured surface.

Figure 2:
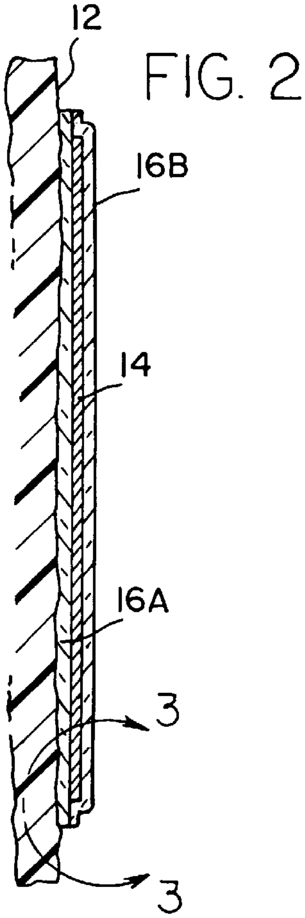
FIG. 2 is a cross-sectional view of the decaled surface taken along line 2—2 of FIG. 1.

FIG. 2 is a cross-sectional view of the decaled substrate of FIG. 1. The decaled substrate 12 includes a first clear ink layer 16A applied to the surface of the substrate 12, a decal 14 applied on top of the first ink layer 16A, and a second clear ink layer 16B applied over the decal 14 and first ink layer 16A to maintain the integrity of the decal.

As mentioned above, a first clear ink layer 16A is screen printed on the rough textured substrate surface 12 using conventional direct screen printing techniques. A water-release slide-off decal 14 is then applied on top of the screen printed ink layer 16A. The screen printed area of the first ink layer 16A is preferably $\frac{1}{8}$" to $\frac{1}{4}$" larger than the dimensions (length and height) of the decal 14. A second clear ink layer 16B is screen printed over the decal 14 on an area approximately equal to the area of the first clear ink layer 16A.

Figure 3:
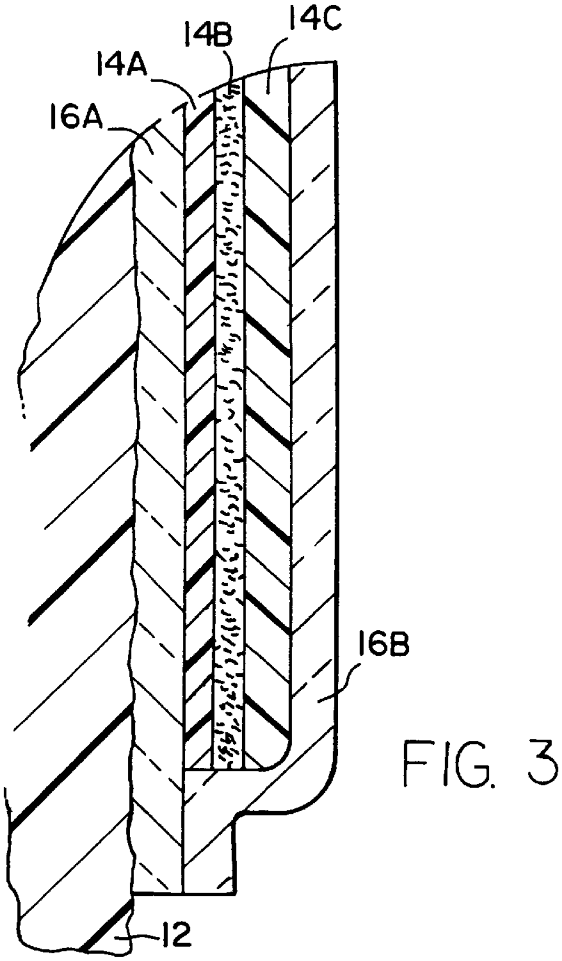
FIG. 3 is an enlarged sectional view of the decaled surface taken along arc 3—3 of FIG. 2.

An enlarged more detailed sectional view of the decaled substrate is shown in FIG. 3. In particular, the individual layers 14A, 14B, and 14C of the decal 14 are shown. The water-release slide-off decal of the present invention typically includes a backing sheet (not shown), a first coating layer 14A, a design layer 14B and a second coating layer 14C. The backing sheet is generally made of paper or plastic material with a water soluble release coating applied to a surface having the decal attached to it.

As seen in FIG. 3, the decal 14 includes a first coating layer 14A which is in direct contact with the first ink layer 16A after the first ink layer has been screen printed on the substrate surface 12, and after the backing sheet (not shown) has been removed from the decal. The design layer 14B preferably includes three or four layers of detailed graphic images made from various combinations of red, yellow, blue and black inks. The designs are detailed, multicolor graphic images made from a four color printing process.

Figure 4:
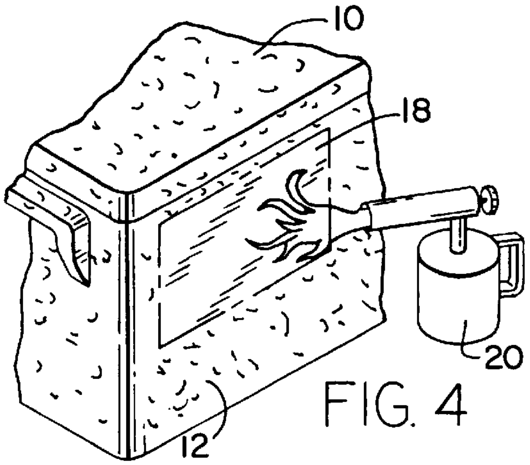
FIG. 4 is a perspective view showing the surface of a cooler being flame treated.

FIGS. 4–7B illustrate the process of the present invention. Referring first to FIG. 4, the exterior surface 12 of cooler 10 is flame treated in an area 18 where a decal is to be applied to the surface of the cooler. The substrate surface 12 must first be flame treated with a propane torch 20 or other such flame source to remove any silicone residue or plasticizers left over from the injection molding process used in making the coolers. The next step in the process is shown in FIG. 5A.

Figure 5A:
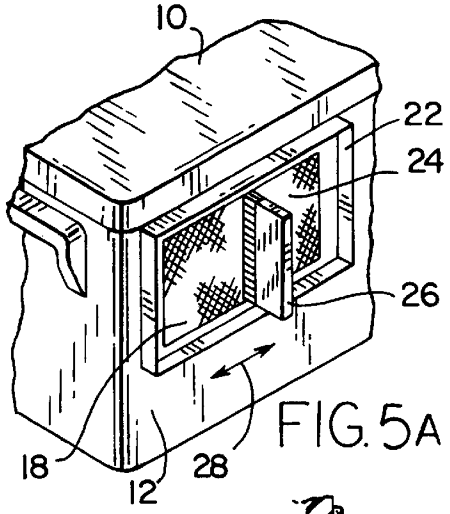
FIG. 5A is a perspective view showing the flame treated surface being screen printed.

Referring next to FIG. 5A, the surface 12 of the cooler 10 in the area 18 of flame treating is screen printed with a clear ink specifically formulated for printing on thermoplastic surfaces, such as polyethylene or polypropylene. The ink is printed directly on the surface 12 of the substrate. The ink is preferably a clear screen printers ink compatible with thermoplastic surfaces such as Podgor PO-1 Clear Poly-All Ink, provided by the Joseph E. Podgor Company. The screen printing should be preferably done within eight hours of the flame treatment. The area printed should be about $\frac{1}{8}$" to $\frac{1}{4}$" larger than the dimensions (length and height) of the decal to be applied to the substrate surface.

The screen printing is accomplished by forcing ink through a fine screen directly onto the surface to be printed. The print screen 22 is placed directly on the substrate surface 12 on a screen printing area 24, and ink is poured onto one end of the screen. A squeegee 26 is then drawn across the screen 22 moving in the direction of arrow 28, forcing the ink through the mesh screen 22 onto the substrate surface 12. The screen printing area 24 of FIG. 5A is generally equivalent to the flame treated area 18 of FIG. 4. The ink is applied only to the area that has been flame treated. After screen printing, the ink is preferably allowed to dry for up to 48 hours before being decaled.

Figure 5B:
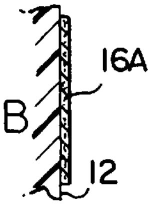
FIG. 5B is a side view of the screen printed surface.

FIG. 5B shows a side view of the substrate having a first clear ink layer 16A applied to its outer surface 12.

Figure 6A:
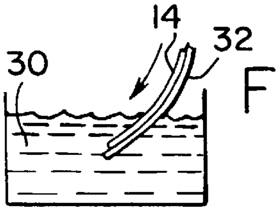
FIG. 6A is a side view showing a water-release slide-off decal being submersed in a container of water.
Figure 6B:
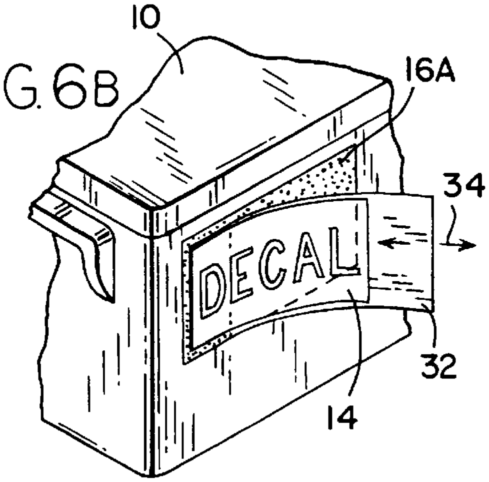
FIG. 6B is a perspective view showing the water-release slide-off decal being applied to the screen printed surface.
Figure 6C:
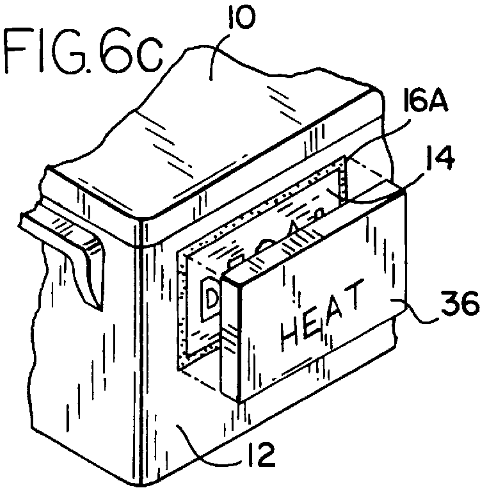
FIG. 6C is a perspective view showing heat being applied to the decaled surface.

FIGS. 6A, 6B and 6C illustrate the decal applying process. The decals to be applied to the substrate surface are water-release slide-off decals. The decals include a backing sheet with a water soluble adhesive applied to its surface, a first coating layer applied to the backing sheet, a graphic design layer applied to the first coating layer, and a second coating layer applied over the design layer. The design layer includes detailed, multicolor graphic images made from a four color printing process using red, yellow, blue and black inks.

As shown in FIG. 6A, the decal 14 is submersed into a container of water 30 to loosen the decal 14 from its backing sheet 32. The decal 14 is then applied directly to the first ink layer 16A by sliding off the backing sheet 32 from the decal 14, as shown in FIG. 6B. The backing sheet 32 is removed from the decal 14 by pulling the backing sheet away from the decal in the direction of arrow 34. The screen printed area of first ink layer 16A is preferably $\frac{1}{8}$" to $\frac{1}{4}$" larger than the dimensions (length and width) of the decal 14 to firmly attach the decal to the substrate surface.

Referring now to FIG. 6C, the decaled surface 12 is heated to reactivate the solvent in the first ink layer 16A. The first ink layer 16A bonds the decal 14 to the surface. The decaled surface 12 is heated for approximately 10 seconds at a temperature of approximately 350° F. The actual surface of the cooler 10 reaches a temperature of about 140° F. A heat source or heater 36 is brought into close proximity with the decaled surface 12 to bond the decal 14 and first ink layer 16A to the substrate surface. The heat provides excellent adhesion of the decal 14 and first ink layer 16A to the substrate surface. The decal 14 and first ink layer 16A essentially blend into the rough textured surface of the cooler.

Figure 6D:
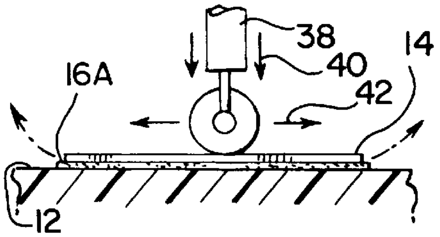
FIG. 6D is a side view showing a roller applying pressure to the heated decaled surface.

In FIG. 6D, the heated decaled surface 12 is squeegeed to remove excess air, ink and water from under the decal 14. A soft roller 38 moving in the direction of arrow 42 applies pressure downwardly against the decaled surface 12 as indicated by arrow 40 to remove air bubbles, excess ink and water from underneath the decal 14. The decaled surface 12 is then allowed to dry for approximately 12–24 hours.

Figure 7A:
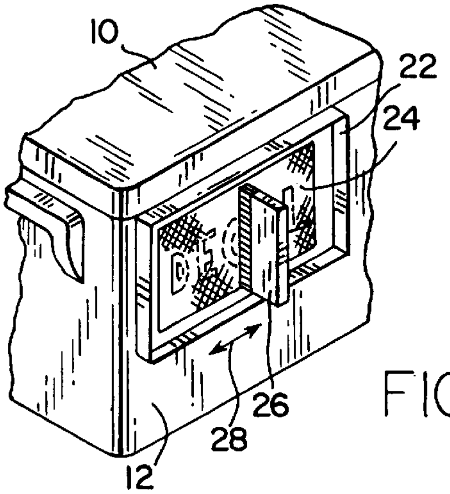
FIG. 7A is a perspective view showing the decaled surface being screen printed.

Finally, a second clear ink layer 16B is applied directly over the decaled surface, as shown in FIG. 7A. This second clear ink is preferably formulated specifically for printing on decaled surfaces, such as the Nazdar D2-170 Clear Decal Lacquer, which is a clear screen printers ink compatible with water-release slide-off decals. The second ink layer 16B is applied to the decaled surface 12 using a similar screen printing technique to that shown in FIG. 5A. A screen 22 is placed directly on the screen printing area 24 and ink is poured onto one end of the screen. A squeegee 26 is then drawn across the screen 22 moving in the direction of arrow 28, forcing the ink through the screen 22 onto the decaled surface 12. The decaled and screen printed substrate is then allowed to dry for a minimum of six hours to completely cure the ink and applied decal.

Figure 7B:
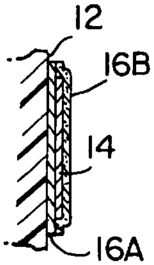
FIG. 7B is a side view of the screen printed decaled surface.

FIG. 7B illustrates the completed decaled and screen printed substrate created in accordance with the process of the present invention. The decaled and screen printed substrate includes a first clear ink layer 16A applied to the surface 12 of the substrate, a decal 14 applied on top of the first ink layer 16A, and a second clear ink layer 16B applied over the decal 14. The decal is encapsulated between two separate clear ink layers 16A and 16B making for a stronger more durable decal.

Various alternatives and embodiments are contemplated as being within the scope of the following claims particularly pointing out and distinctly claiming the subject matter regarded as the invention. In particular, the process works equally well on substantially smooth thermoplastic substrates, and on leather or synthetic leather substrates having substantially smooth or rough textured surfaces.

We claim:

1. A method of applying a decal to a substrate comprising the steps of:

flame treating the substrate in an area where the decal is to be applied;

applying a first ink layer on the flame treated substrate;

applying a decal to the inked substrate;

heating the decaled substrate;

applying pressure to the decaled substrate; and applying a second ink layer directly over the decaled substrate.

2. The method of claim 1 wherein the substrate is flame treated by a propane torch.

3. The method of claim 1 wherein the substrate is made of a thermoplastic material such as polyethylene.

4. The method of claim 1 wherein the first ink layer is applied by a direct screen printing process using a printing screen and squeegee to apply the ink directly to the flame treated substrate.

5. The method of claim 4 wherein the area screen printed is slightly larger than the dimensions of the decal.

6. The method of claim 4 wherein the first ink layer is a clear screen printers ink.

7. The method of claim 1 wherein the decal is a water-release slide-off decal.

8. The method of claim 1 wherein the decal comprises detailed, multicolor graphic images made from a four color printing process.

9. The method of claim 1 wherein the decaled substrate is heated to a temperature of approximately 140° F.

10. The method of claim 1 wherein the pressure is applied by a soft roller.

11. The method of claim 1 wherein the second ink layer is applied by a direct screen printing process using a printing screen and a squeegee to apply the ink directly over the decaled substrate.

12. The method of claim 11 wherein the area screen printed is slightly larger than the dimensions of the decal.

13. The method of claim 11 wherein the second ink layer is a clear screen printers ink.

14. The method of claim 1 comprising the further step of allowing the first ink layer to dry for up to 48 hours prior to applying the decal.

15. The method of claim 1 further comprising the step of allowing the decaled screen printed substrate to dry for a minimum of six hours.

16. A method of applying a decal to a substrate comprising the steps of:

flame treating the substrate in an area where the decal is to be applied;

applying a first ink layer on the flame treated substrate;

allowing the first ink layer to dry;

applying a water-release slide-off decal to the inked substrate;

heating the decaled substrate;

applying pressure to the decaled substrate;

allowing the decaled substrate to dry;

applying a second ink layer directly over the decaled substrate; and allowing the second ink layer to dry.

17. The method of claim 16 wherein the first ink layer is allowed to dry for up to 48 hours before being decaled.

18. The method of claim 16 wherein the decal comprises detailed, multicolor graphic images made from a four color printing process.

19. The method of claim 16 wherein the decaled substrate is heated to a temperature of approximately 140° F. for about 10 seconds.

20. The method of claim 16 wherein the decaled substrate is allowed to dry for approximately 12–24 hours.

21. The method of claim 16 wherein the second ink layer is allowed to dry for a minimum of six hours.

* * * * *